United States Patent
Sümmermann

(10) Patent No.: US 10,427,894 B2
(45) Date of Patent: Oct. 1, 2019

(54) MODULE CONNECTOR, MODULAR CONTAINER, AND SEALING ELEMENT THEREFOR

(71) Applicant: Volkmann GmbH, Soest (DE)

(72) Inventor: Konrad Sümmermann, Soest (DE)

(73) Assignee: Volkmann GmbH, Soest (DE)

( * ) Notice: Subject to any disclaimer, the term of this patent is extended or adjusted under 35 U.S.C. 154(b) by 0 days.

(21) Appl. No.: 16/142,654

(22) Filed: Sep. 26, 2018

(65) Prior Publication Data

US 2019/0092582 A1 Mar. 28, 2019

(30) Foreign Application Priority Data

Sep. 26, 2017 (DE) .................... 20 2017 004 987 U

(51) Int. Cl.
*B65G 51/03* (2006.01)
*F16L 23/12* (2006.01)
(Continued)

(52) U.S. Cl.
CPC ............. *B65G 51/03* (2013.01); *B65D 53/02* (2013.01); *B65D 88/06* (2013.01); *B65D 88/26* (2013.01);
(Continued)

(58) Field of Classification Search
CPC .......... F16J 15/025; F16J 15/002; F16J 15/02; F16J 15/46; F16J 15/48; F16J 15/062;
(Continued)

(56) References Cited

U.S. PATENT DOCUMENTS 3,606,348 A * 9/1971 Taylor .................... F16J 15/008
277/328
5,076,594 A * 12/1991 Baugh .................... F16J 15/002
277/615
(Continued)

FOREIGN PATENT DOCUMENTS

DE 1185873 B 1/1965
DE 4340051 A1 6/1995

OTHER PUBLICATIONS

Espacenet Bibliographic data: DE4340051(A1), Published Jun. 1, 1995, 2pgs.

*Primary Examiner* — James R Bidwell
(74) *Attorney, Agent, or Firm* — Rankin, Hill & Clark LLP

(57) ABSTRACT

A module connector for holding and/or transporting of bulk goods for connecting a first container module to a second container module, the container modules being joined together have an aligned container inner surface, a first seal arranged between the first container module and the second container module, a second seal arranged between the first container module and the second container module, the first seal is arranged in a recess and the second seal in a groove, the first seal forming an inner seal and the second seal forming an outer seal, the second seal produces a sealing of the interconnected container modules especially if the first seal fails, the first seal has at least one crimp region, which is crimped by a first and/or second flange surface such that one end face of the first seal is situated flush and/or aligned with the container inner surface without forming a cavity in the area of the end face of the first seal as well as a seal element for the module connector for the sealing of the container.

22 Claims, 9 Drawing Sheets

(51) Int. Cl.
  *B65G 53/52* (2006.01)
  *F16L 23/02* (2006.01)
  *B65D 88/06* (2006.01)
  *B65D 88/26* (2006.01)
  *B65D 88/64* (2006.01)
  *B65D 90/02* (2019.01)
  *B65D 90/06* (2006.01)
  *B65D 53/02* (2006.01)

(52) U.S. Cl.
  CPC ............. *B65D 88/64* (2013.01); *B65D 90/02* (2013.01); *B65D 90/06* (2013.01); *B65G 53/521* (2013.01); *F16L 23/02* (2013.01); *F16L 23/12* (2013.01)

(58) Field of Classification Search
  CPC ....... F16J 15/022; F16J 15/028; F16L 17/035; F16L 17/06; F16L 23/26; F16L 23/18; F16L 23/22; B65G 21/06; B65G 53/521; B65G 51/03; B65D 90/006
  USPC ....... 277/431, 628, 314, 590, 594, 603, 608, 277/614, 626, 641, 642, 649, 914; 198/860.2
  See application file for complete search history.

(56) References Cited

U.S. PATENT DOCUMENTS

| | | | | |
|---|---|---|---|---|
| 5,078,435 | A * | 1/1992 | Heyl | F16L 23/162 |
| | | | | 285/349 |
| 8,668,205 | B2 * | 3/2014 | Schmitt | F16J 15/0825 |
| | | | | 277/592 |
| 2004/0217553 | A1 | 11/2004 | Shaw et al. | |
| 2009/0160137 | A1 * | 6/2009 | Smathers | F16J 15/062 |
| | | | | 277/642 |
| 2011/0278839 | A1 * | 11/2011 | Danielewicz | F16J 15/061 |
| | | | | 285/335 |
| 2012/0306163 | A1 * | 12/2012 | Gronauer | F16J 15/104 |
| | | | | 277/611 |
| 2014/0197605 | A1 * | 7/2014 | Shimazoe | H01M 8/0284 |
| | | | | 277/641 |
| 2015/0097339 | A1 * | 4/2015 | Triebe | F01C 19/005 |
| | | | | 277/312 |
| 2015/0139832 | A1 * | 5/2015 | Murty | E21B 33/10 |
| | | | | 417/423.3 |

* cited by examiner

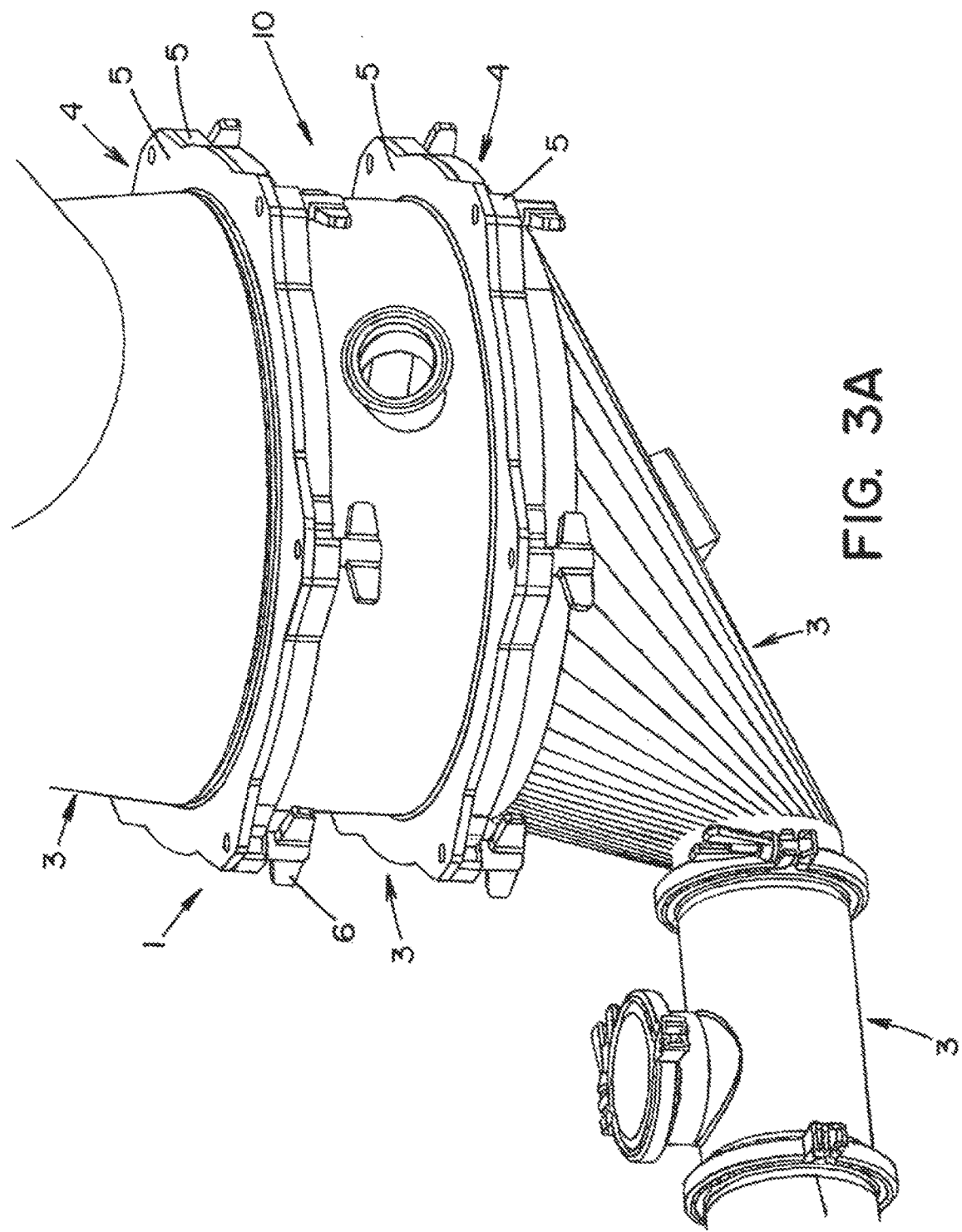

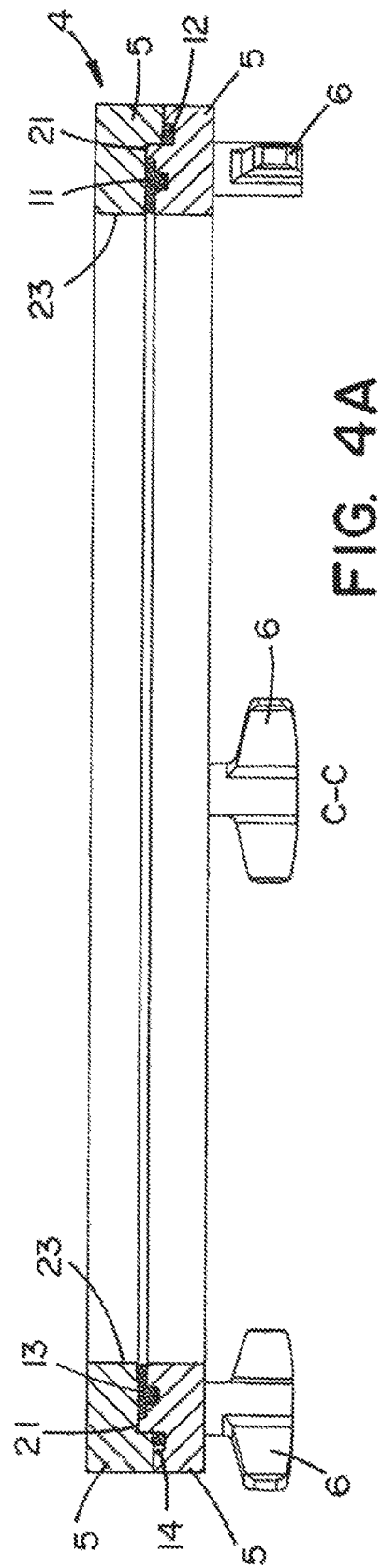
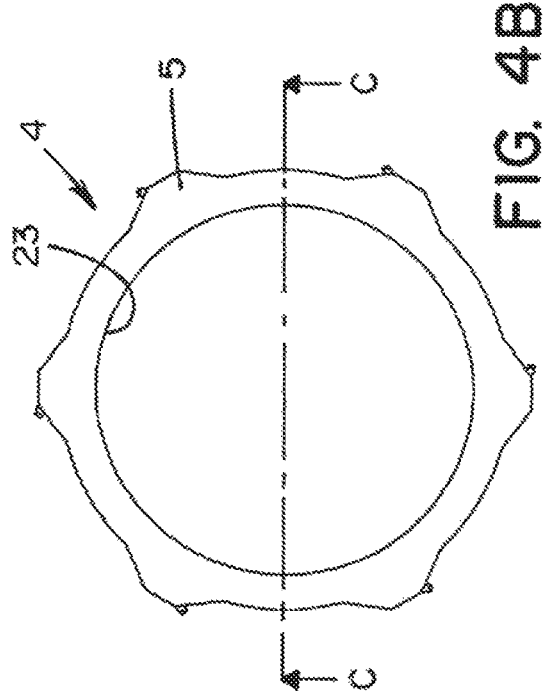
FIG. 4A
FIG. 4B

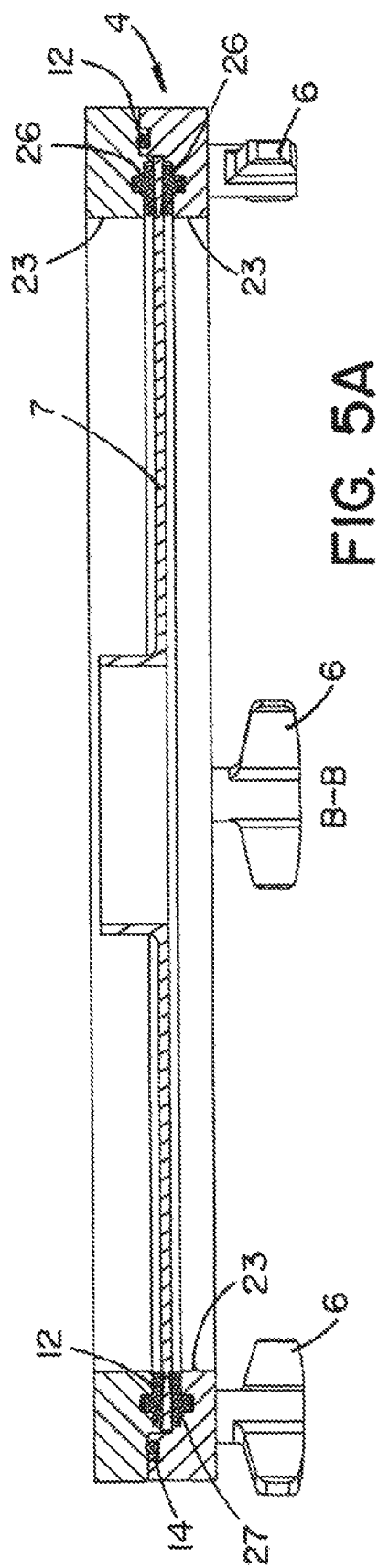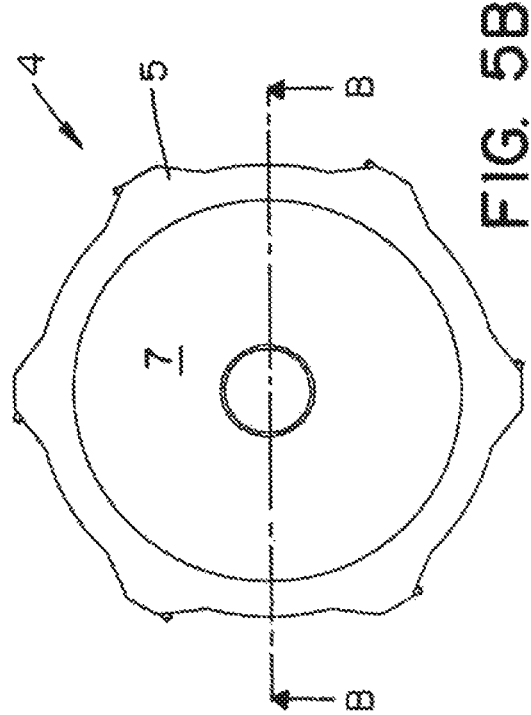

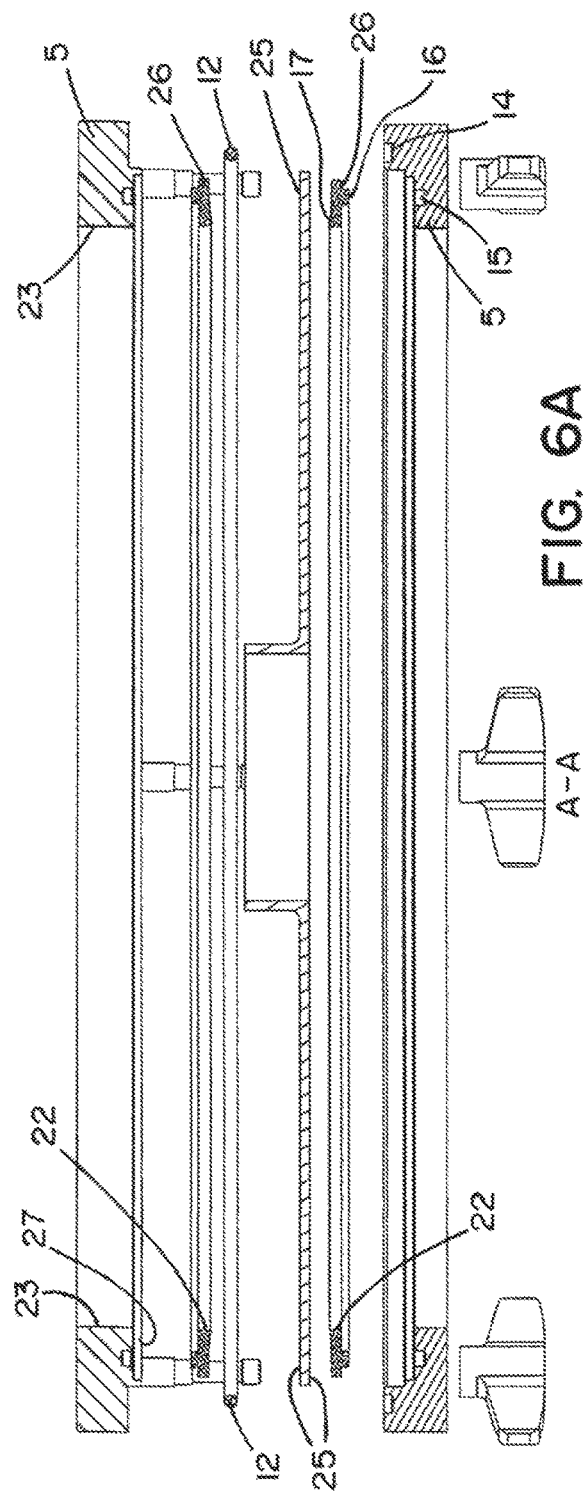
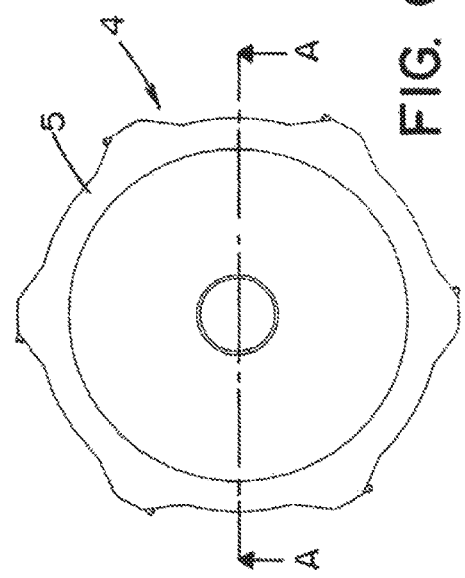
FIG. 6A
FIG. 6B

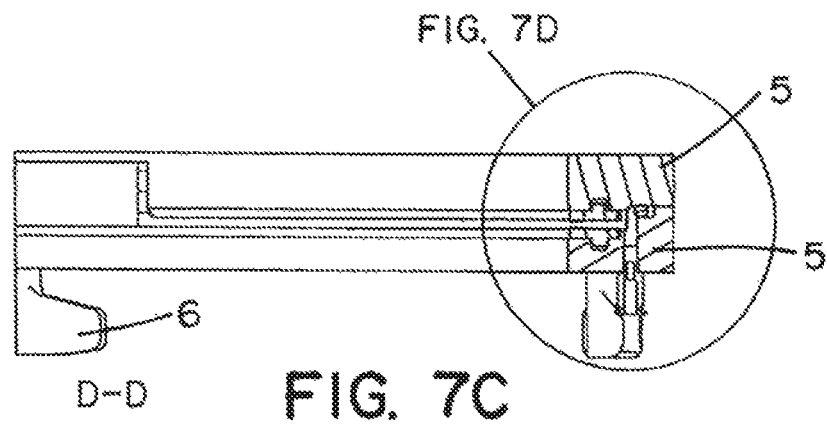
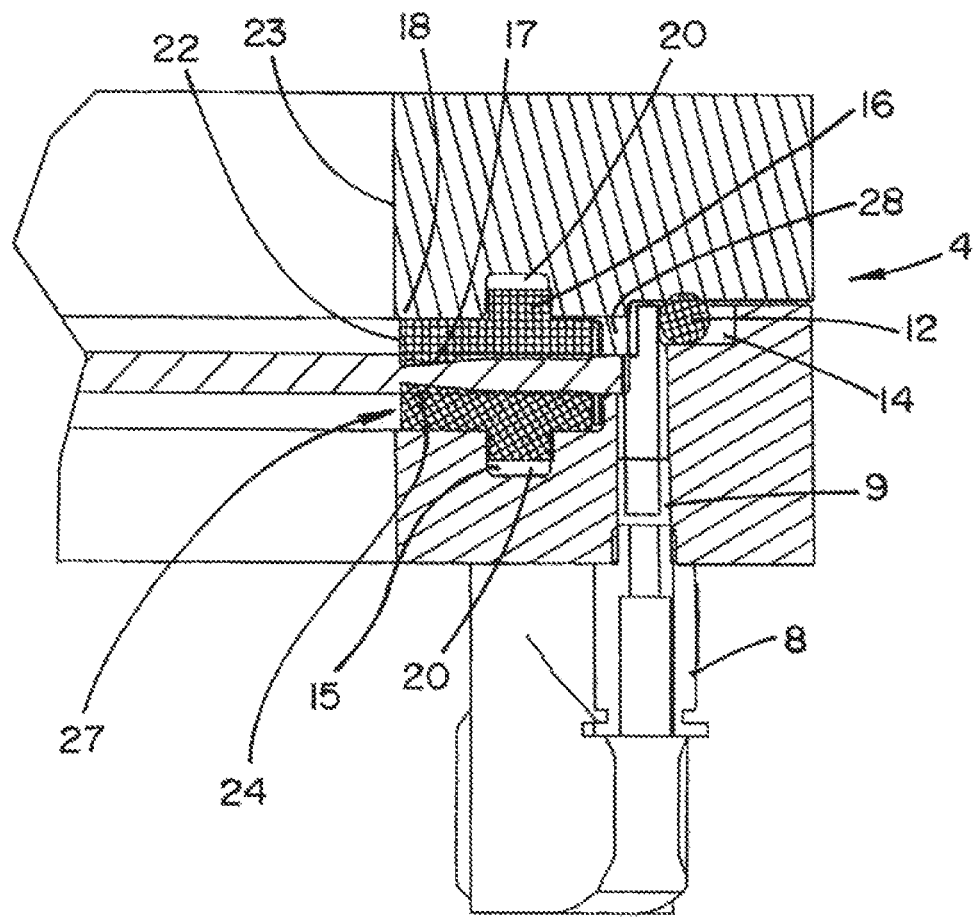

MODULE CONNECTOR, MODULAR CONTAINER, AND SEALING ELEMENT THEREFOR

FIELD OF THE INVENTION

The invention relates to a module connector, a modular container, as well as a seal element therefore. The modular container accordingly serves for containing and/or transporting of bulk goods. The container interior preferably has a pressure difference from the container exterior formed as a partial vacuum or an excess pressure. It may also be provided that ambient pressure prevails in the container interior (pressure-less state). The container is formed from a first container module which is tight against the container exterior and at least one second container module which is tight against the container exterior.

The module connector serves for the (gas) tight connecting of two container modules of a modular container. The container may have attributes of a containment, such as is used during the conveying and/or keeping of granular and/or powdery conveyed and/or stored product. Usually, the container modules have flange connections. In order for the module connector to be tight, a seal is installed in the flange connection. The seal may be formed from an elastic material, such as a plastic. With the aid of screws, wing nuts, or similar fastening means, the flanges of two modules being connected are pressed against each other, generating a pressing force, which exerts a mechanical force or a pressure on the elastic seal.

TECHNOLOGICAL BACKGROUND

The problem with customary seals is a durable sealing, especially under particular hygiene requirements and/or given a simple and secure handling. Furthermore, the module connector should be durably tight in a temperature range between around 0° C. and around 130° C.

PRESENTATION OF THE INVENTION

Now, the basic problem is to optimize module connectors and to give them diversified uses. In particular, steps should be indicated by which the most easily assembled (module) connector can be achieved, preventing leaks, and meeting the hygiene requirements for such modules and/or containers. This problem is solved by a module connector according to the invention of this application. Accordingly, the module connector serves for connecting a first container module to a second container module. The modular container may comprise two or more, i.e., three, four, five, and so forth, modules and form or contain the containment. In the containment, a conveyed product, especially a powderlike and/or granular product, is delivered, or a storage product, especially a powderlike and/or granular one, is stored (temporarily). The first container module comprises a first flange with a first flange surface. The second container module comprises a second flange with a second flange surface. The flanges are fastened together by suitable fastening means, such as screws/nuts or articulated thumbscrews/wing nuts. The fastening means may preferably comprise clamping elements.

The container modules being joined together have an aligned, especially a flush, container inner surface. A first seal is arranged between the first container module and the second container module. The seal can be formed from an elastic material, such as a plastic. A second seal is arranged between the first container module and the second container module. The second seal serves as a fail-safe seal, which seals the container if the first seal should have a leak. The first seal might have a leak if the material of the seal becomes fatigued, if the seal rips or breaks, if the seal was not installed with precise fit, for example due to contamination, or if it is slanting or skewed.

The first seal is arranged in a recess and the second seal in a groove. The second seal may be formed, for example, as an O-ring, whose diameter is larger than the depth of the groove in which the second seal is installed.

The first seal forms an inner (radial) sealing with respect to the container or the container volume. The second seal forms an outer (radial) sealing with respect to the container (container volume). For example, if the container has cylindrical geometrical properties, the flange would preferably be (circular) round and the first and/or the second seal could have an annular symmetry. Since the first seal may form an inner seal, it would have a smaller ring diameter than the second outer seal.

The second, preferably outer seal produces a (redundant) sealing of the interconnected container modules especially if the first, inner seal fails or at least has a leak. Accordingly, the second seal forms a safety seal.

The first seal has at least one crimp region, which when the first flange is arranged at or on the second flange is crimped by the first and/or the second flange surface, preferably by the first flange surface, such that one end face of the first seal is situated flush and/or aligned with the container inner surface and without forming a cavity in the area of the end face of the first seal. The end face forms a defined sealing edge. The seal must not let through particles into the interior. By mechanical action on the crimp region, for example by screwing together the container modules, the seal is pressed into the desired position so that it neither protrudes into the container interior nor does it form a trough or a cavity where the seal borders, or at least is supposed to border, on the inner wall of the container. Thanks to the crimp region, the first seal is optimally positioned, in terms of the aligned and/or flush seating of the seal relative to the container inner surface. At the same time, the crimp region has the effect that the seal is arranged particularly firmly and securely on the inside, i.e., in the area of the container inner surface, even if the container is heated or cooled, for example as is required. Thermal expansion or shape changes impair the seating/holding of the seal in the neighborhood of the crimp region due to the stronger pressure forces acting on the seal there and they are significantly less due to the improved properties in regard to seating/holding, therefore being entirely avoided. A thermally caused shifting of the seal in the crimp region or in the region of the end face is prevented.

Because the seal is aligned with the inner container surface and lies flush against the container inner wall, cavities are prevented in the container interior in the area of the seal. Cavities in the area of the end face or in the crimp region of the seal are also avoided in that the seal in the area of the inner container surface expands or shrinks by virtue of thermal effects. The preventing of cavities means that particles of the conveyed or stored product cannot accumulate there, which in turn improves the hygiene properties of the container interior.

According to one preferred embodiment of the module connector, the recess and/or the groove is/are arranged in the first and/or in the second flange. For example, the recess may be arranged in the first flange, the groove in the second flange. Alternatively, it may be provided that the recess is arranged in the second flange and the groove in the first flange. Alternatively, recess and groove may be arranged in the first flange or in the second flange. It may also be provided that a partial groove and/or a partial recess is formed in each of the first and the second flange, while the second seal can be arranged in the partial grooves and the first seal in the partial recesses. The position of each partial groove/partial recess is such that in the assembled state (modules connected) they add up to a groove/recess.

The module connector is optimized in that the seal combination of first, flush positioned seal with improved pressing force in the crimp region and second, outer fail-safe seal ensures that the containment is (gas) tight against the surroundings. A weakening of the first seal does not result in leakage, since the containment is sealed redundantly by the second seal. The (inner) first seal is closed off flush, at least aligned, with the inner wall of the container, so that no cavities and/or niches and/or gaps are formed in the vicinity of the end face or the crimp region, especially in the vicinity of the container inner wall, bordering on the first seal, in which powdery or granular material or fragments of granular material could settle and get stuck. Thus, especially under thermal stress, damage to the material of the seal is avoided, which further optimizes the seal of the module connector.

An optimization of module connectors is also accomplished by the module connector further including an intermediate element. The module connector likewise serves for the connecting of two flanges of container modules being connected. The first flange comprises a first flange surface, the second flange a second flange surface. The intermediate element is arranged between the first container module and the second container module. The intermediate element may be formed by a filter plate, for example, or it may comprise a filter plate.

The container modules being joined together have a flush container inner surface. Insofar as the intermediate element protrudes into the container volume, such as would be the case with a filter module, for example, the inner surfaces of the container modules are not flush in the area of the intermediate element.

There is arranged each time between the first container module and a first surface of the intermediate element and the second container module and a second surface of the intermediate element, situated opposite the first surface of the intermediate element, one of two part seals of a first seal. Oppositely situated surfaces of the intermediate element are sealed by means of the first seal, the first part seal resting against the first surface and the second part seal against the second surface. The intermediate element is so to speak arranged between the part seals of the first seal.

A second seal is arranged between the first container module and the second container module. Insofar as the container has cylindrical geometrical features, the second seal sits radially outward in relation to the intermediate element, so that the second seal does not stand in contact with the intermediate element.

The part seals of the first seal are arranged respectively in a part seal recess and the second seal is arranged in a groove. The groove may be arranged in the first, preferably in the second flange. The first of the two part seal recesses of the first seal can be arranged in the first flange, the second part seal recess can be arranged in the second flange. Alternatively, at least one or both part seal recesses can be arranged in the intermediate element.

The part seals of the first seal form an inner (radial) seal with respect to the container or with respect to the container volume. The second seal forms an outer (radial) seal with respect to the container (container volume). The second (outer) seal provides a sealing of the interconnected container modules, especially if the first (inner) seal fails or at least has a leak.

At least one of the part seals of the first seal, especially both part seals, each comprise at least one crimp region which, upon arranging the first flange at or on the second flange and at or on the intermediate element, is crimped by the first and/or the second surface of the intermediate element such that at least one end face of at least one part seal, especially both end faces of both part seals, of the first seal are arranged flush with the container inner surface and without forming a cavity in the region of the end faces of the part seals. Cavities in the area of the part seal recesses are prevented in this way, and the hygiene properties of the module connector and the effect of the seal are improved in this way.

One part seal recess may be situated arranged in the first flange and the second part seal recess in the second flange. The groove may be situated in the first or in the second flange. One part seal recess may be situated in a surface of the intermediate element, for example such that in particular one part seal recess is situated in the first surface of the intermediate element and the second part seal recess is situated in the second surface of the intermediate element.

The connected modules may have a round or almost round cross section, wherein the groove is formed as an annular groove, especially a circular annular groove, and wherein the recess or the at least one part seal recess has an annular geometry at least for a portion. The first seal or the part seals of the first seal and/or the second seal may accordingly be substantially annular in configuration (sealing rings).

The groove and/or the recess and/or at least one part seal recess may in one preferred embodiment of the module connector be fluidically connected. At least one bypass may be provided for this, preferably with an inlet bypass and an outlet bypass. The bypass or the inlet bypass and/or outlet bypass may be connected to a pump and/or to a pressure metering, by which a flow in the groove and/or in a part region of the recess or in a part region of the at least one part seal recess can preferably be created. Thanks to this flow, particles in the region of the recess or part seal recess can be removed or flushed out by means of a (gas) flow, which improves the quality of the seal and the hygienic properties of the module connector. Insofar as a pressure metering is provided, the (pre)pressure inside the recess/part seal recess/ groove can be metered and monitored. A pressure drop is a sign of failure of the first and/or the second seal. Too low a pressure or absence of rated pressure immediately after the assembly of the module connector is a sign of an assembly error, such as a missing (first and/or second) seal.

Preferably it may be provided that the recess or at least one part seal recess and the groove are fluidically interconnected by at least one connection duct. The connection duct is preferably situated in the first flange. With the connection duct, a closed cavity system is formed, in which the first and/or the second seal are arranged. The cavity system may be fluidically flooded/flushed, for example to improve the sealing action of the (first/second) seal by cleaning out the cavity system and by removing foreign particles. A (pre) pressure may be set in the cavity system, which takes strain off the seal(s) and makes possible a pressure monitoring in the cavity system. Pressure changes in the cavity system are a sign of disruptions of the seals within the module connector. Costly troubleshooting for leaky containments are avoided; a missing or leaky seal can be identified more quickly and effectively.

The seal or the part seal, especially the crimp region of the seal or the part seal, is formed from a flexible material, wherein the crimp region of the seal or the part seal in the non-connected state of the container modules protrudes from the recess or part seal recess. The crimp region of the seal in the connected state of the container modules is shoved or press-fitted by mechanical pressure into the region of the recess or part seal recess. The crimp region of the seal/part seal comprises a material surplus of the seal material, which is compressed when the module connector is closed. Thanks to the compressing, the seal/part seal of the adjoining sealing surface presents a greater resistance, which on the one hand strengthens and on the other hand stabilizes the seating of the seal/part seal in the recess/part seal recess. A stabilized seating is advantageous when the seal/part seal is exposed to thermal changes, such as during heating or warming of the container. Even under intense temperature fluctuations, the end face of the seal near the crimp region does not change its position within the recess/part seal recess. Accordingly, the end face also remains stable in position under thermal fluctuations, so that the end face of the seal/part seal remains aligned and flush or at least aligned in regard to the inner container surface(s) even during thermal fluctuations. The crimp region of the seal or the part seal comprises at least one wedge surface, and/or at least one bulge, and/or at least one web. Preferably, the crimp region comprises a wedge surface, so that the seal/part seal is thicker in the region of the end face than in the region of the seal body.

At least one positioning means can be provided in the receptacle or in the part seal receptacle and/or in the flange bordering on the receptacle or the part seal receptacle, which preferably comprises a groove or a bulge, and in which a positioning element of the seal or part seal can be arranged such that the seal or part seal is not movable in at least one direction, preferably in the direction pointing toward the container inner region. An exact fit between positioning means and positioning element is not required, a play in at least one direction may be provided between positioning means and positioning element. The positioning means/positioning element ensures on the one hand that the seal/part seal cannot be pushed out from the recess/part seal recess, such as when mounting the container modules; on the other hand, it ensures that the seal/part seal sits stationary in the recess/part seal recess in the region of its end face, so that no cavity is formed between seal/part seal and container inner wall or recess/part seal recess.

In order that the seal/part seal does not rip, for example under thermal changes, or become shifted in the direction of the container volume, at least one dead space may be provided in the region of the recess/part seal recess, but not in the region of the container inner wall, into which at least one section of the seal or part seal can expand mechanically, especially due to thermal changes. The seal is therefore expandable, but not at its end face aligned with or flush against the container inner wall. The expansion thus does not occur radially inward, but instead in another direction, such as radially outward.

A (modular) connector which can be assembled as easily as possible and preventing the formation of leaks is furthermore possible with a container according to the invention of this application. The container is suitable for holding and/or transporting of bulk goods, wherein the container interior has a pressure difference with respect to the container exterior, preferably formed as a partial vacuum or an excess pressure. It may also be provided that no pressure difference is present between the container interior and the container exterior, i.e., the pressure in the container may correspond to the ambient pressure. The container is formed from a first container module which is tight relative to the container exterior and at least one second container module which is tight relative to the container exterior. The first container module and the at least second container module are joined together by a module connector as described herein, which provides sealing with respect to the container exterior. Preferably the container modules, the module connector, and the modules are electrically conductive with each other. Thanks to the electrical conductivity, electric charges can drain off across the (metallic) container wall, so that electric discharges (spark formations) in the (substantially metallic) container are prevented. The conductivity is achieved in that electrical contact exists between the modules in the module connector. For example, the (metallic) flanges of the module connector may be contacted without the (plastic) seals between the flanges providing an insulation. The container may be formed from a vacuum conveyor or comprise a vacuum conveyor. Alternatively or additionally, the container may be formed from a lump breaker or comprise a lump breaker.

An optimization of a module connector is furthermore achieved by a seal element for a module connector according to the invention of this application. The seal element in particular is for a module connector as described here or for the sealing of a container as described here. The seal element comprises at least one end surface, which is suited to be flush with at least one surface of one component of the module connector, preferably with an inner surface or container inner surface. The seal element, preferably in the region of the end surface or bordering on the end surface, comprises a crimp region which can be press-fitted by mechanical action. There may be provided a crimp region comprising at least one wedge surface. The end surface of the seal element can be press-fitted into a recess situated in one component of the module connector for the seal, such that no cavities are formed in the region of the end surface of the seal element between the seal element and the component of the module connector. The press fitting occurs when the module connector is closed. The seal element preferably has a substantially annular geometry.

Preferably it may be provided that the seal element comprises a body with a substantially rectangular cross section geometry. The crimp region is arranged on the body. A positioning element, especially a web-shaped or ring-shaped positioning element, may be provided for the positioning in a groove or recess for the seal in one of the components of the module connector.

The aforementioned components to be used according to the invention, which are claimed and described in the sample embodiments, are not subject to any exclusionary conditions in terms of their size, configuration, choice of material, or technical design, so that the selection criteria known in the field of application may be used without limitation.

Further details, features and benefits of the subject matter of the invention will emerge from the dependent claims, as well as the following description and the accompanying drawing, in which sample embodiments of module connectors are represented—as an example. Individual features of the claims or the embodiments may also be combined with other features of other claims and embodiments.

BRIEF DESCRIPTION OF THE FIGURES

The drawing shows

DETAILED DESCRIPTION OF SAMPLE EMBODIMENTS

Figure 1:
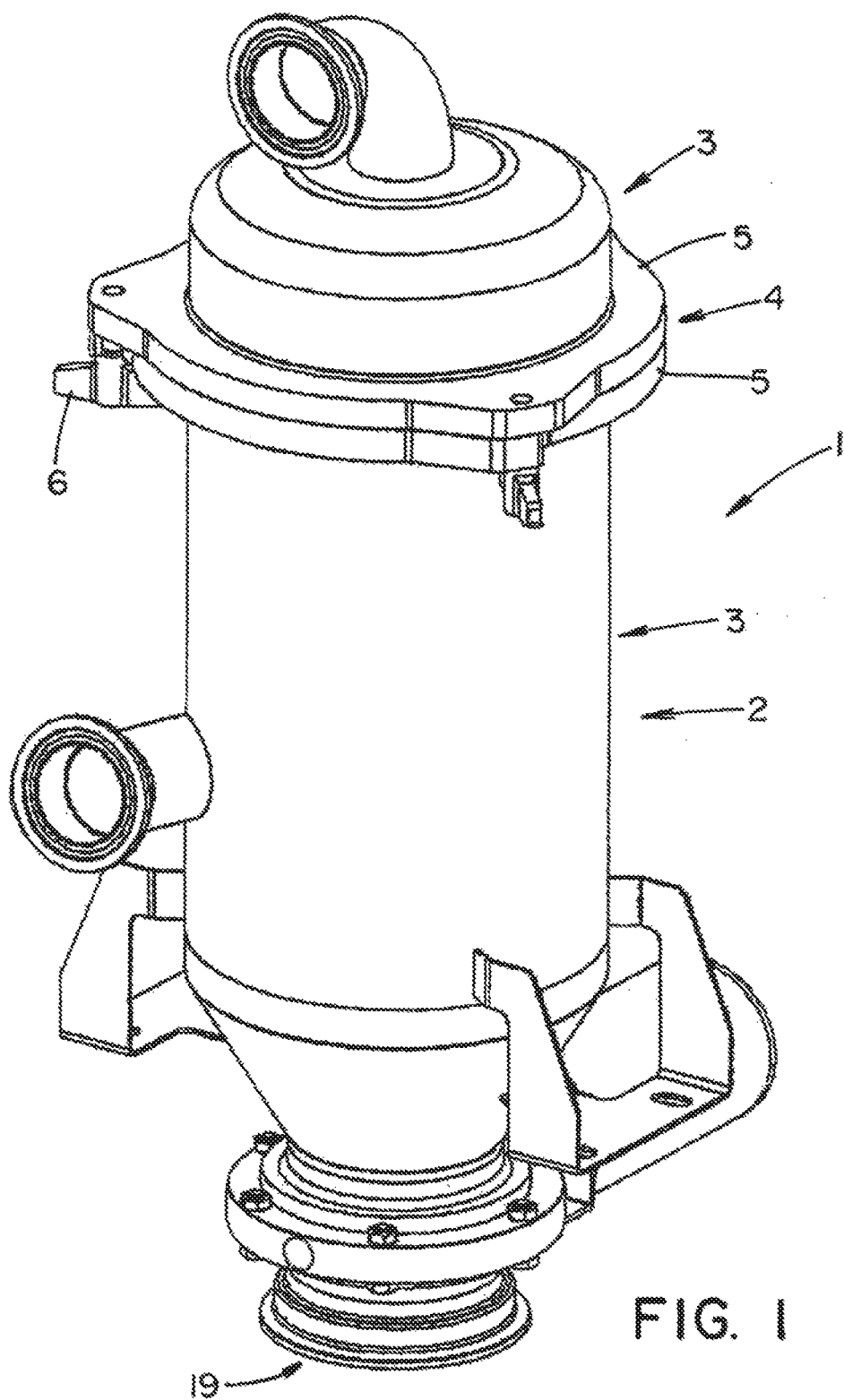
FIG. 1 a container formed as a vacuum conveyor in perspective schematic representation, FIG. 2 a module connector in perspective schematic representation, FIG. 3A a cutout of a container formed as a lump breaker in perspective schematic view, FIG. 3B a perspective cross sectional view of a cutout of the container of FIG. 3A, FIG. 4A/B a configuration of a module connector in cross sectional view and top view, FIG. 5A/B a variant configuration of a module connector in cross sectional view and top view, FIG. 6A/B an at least partly disassembled module connector in cross sectional view and top view, and FIG. 7A-D a module connector with bypass in different views.

A modular container 1 for a vacuum conveyor 2 is shown in FIG. 1. The modules 3 of the container 1 have cylinder geometry features and are joined together across a module connector 4. The module connectors 4 each comprise flanges 5, which are fastened together by screws 6. In order for the container modules 3 to be interconnected in gas-tight manner, which is required for a fluid stream inside the containment (container interior 19) under slight internal pressure, for example, seal elements are required within the module connector 4. The seal elements are arranged in the area of the flanges 5.

Figure 2:
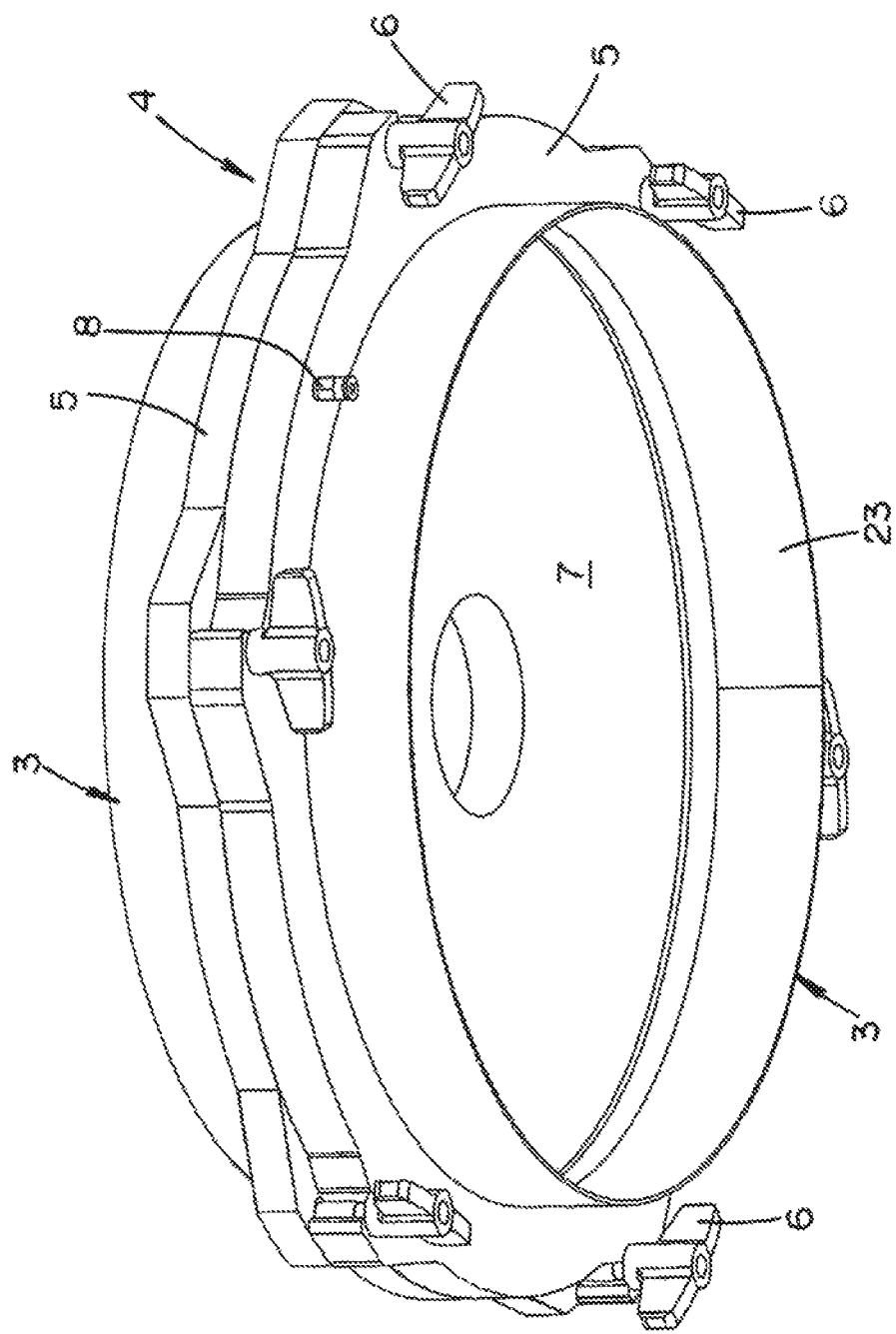

A perspective view of a module connector 4 with cylinder geometry features can be seen in FIG. 2. The module connector 4 comprises two round flanges 5, which are fastened to each other by fastening means, here, several (six) thumbscrews 6. The first flange 5 is arranged on a first module 3, the second flange 5 on a second module 3. Between the flanges 5 of the module connector 4 of FIG. 2 there is arranged an intermediate element 7, which is formed in FIG. 2 as a (substantially round) filter plate. On the second flange 5 of the module connector 4 of FIG. 2 there can be seen a connection 8 of a bypass 9, by which a cavity system for the seal elements (not shown in FIG. 2) can be evacuated, and through which the prepressure in this cavity system can be monitored with a pressure metering device.

Figure 3B:
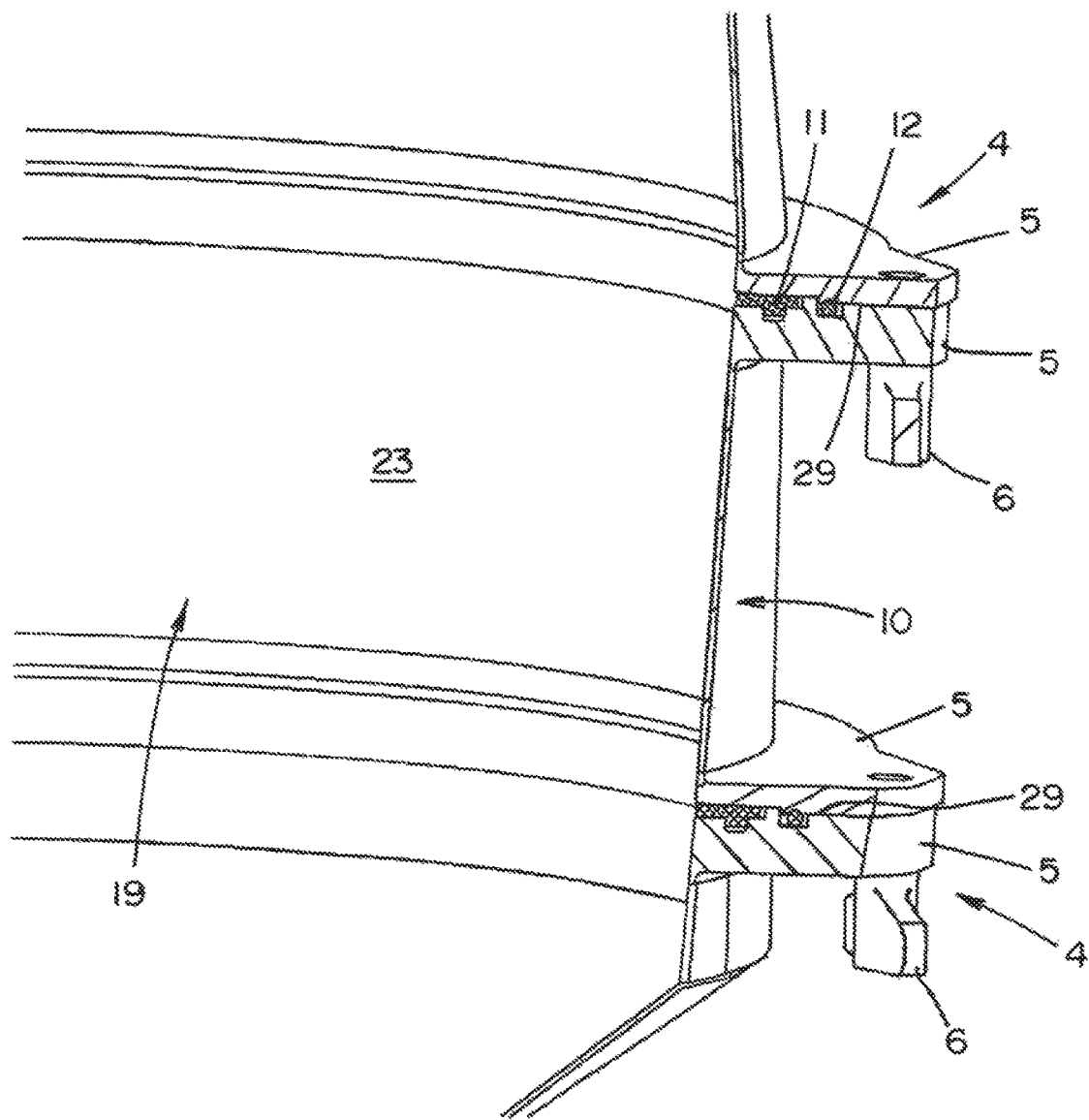
Figure 7A:
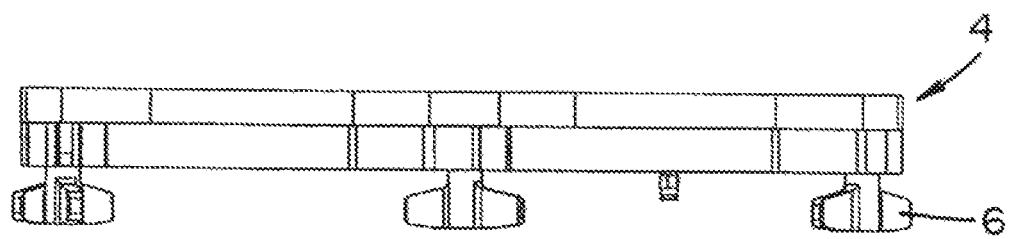
Figure 7B:
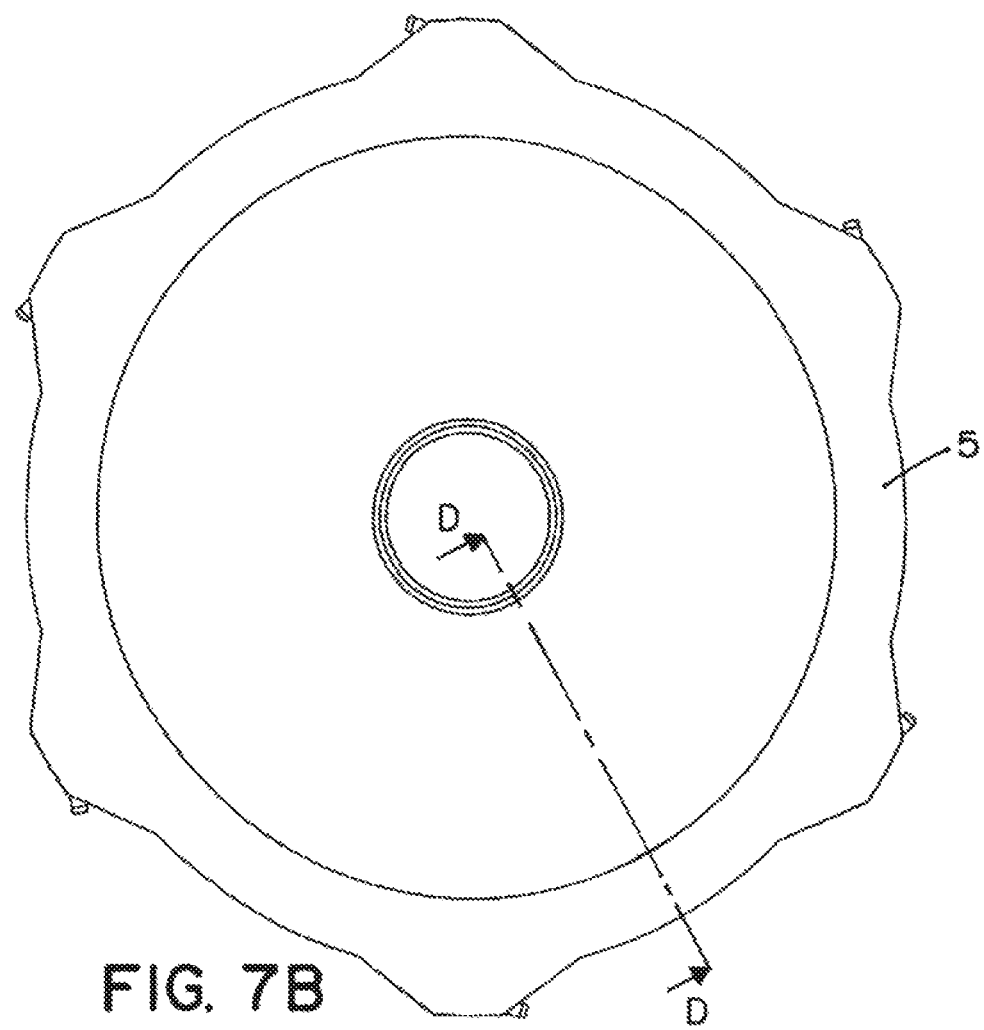

Different schematic views of a lump breaker 10 can be seen in FIGS. 3A and 3B. FIG. 3A shows a perspective view of the lump breaker 10 as part of a modular container 1 with cylinder geometry features. FIG. 3B shows a cutout of the lump breaker 10 as a perspective cross sectional view. The lump breaker 10 is arranged with two module connectors 4 in the modular container 1.

Each module connector 4 of FIG. 3B has two round flanges 5. One of the flanges 5 is arranged on the lump breaker 10, the other respective flange 5 on a neighboring container module 3. With the aid of the cross sectional view of FIG. 3B, one can see that a first and a second (substantially ring-shaped) seal 11, 12 are arranged between the flanges 5 of each module connector 4. Each first seal 11 is arranged in a recess 13, which is located in the second flange 5 of the module connector 4. The recess 13 in the second flange 5 borders on an offset 29 in the first flange 5.

The offset 29 forms, at least partly, a region of the seal receptacle or recess (13). The offset 29 forms a centering means for the centering of the first and second flange (5) of the module connector 4. The second seal 12 is arranged in an annular groove 14, which is likewise located in the second flange 5. The second seal 12 is formed as an O-ring.

A positioning means 15 shaped as a groove is arranged in the recess 13 for the first seal 11, in which a positioning element 16 of the first seal 11 is located. The positioning element 16 is formed as an angular bulge or as a shoulder of the first seal 11. The positioning element 16 in the positioning means 15 prevents the first seal 11 from shifting radially inward. Thanks to a wedge surface 17 in the area of the body of the first seal 11, the seal 11 is pressed more strongly against the flange surface 18 at the end face, so that the first seal 11 has a firm seating at the end face and cannot be displaced into the container interior (19, containment). A defined bearing surface of the first seal 11 is formed, which is located in the crimp region 24 or in the wedge surface 17, respectively. The defined bearing surface makes a major contribution to the sealing of the flanges 5. Accordingly, the first seal 11 does not seal at any given point of the seal 11, but preferably where the defined bearing surface rests against the flange 5 (against the sealing surface 25). Any expansion of the seal 11, for example due to thermal changes (temperature rise or temperature fall in the containment), does not occur in the direction of the container volume (19), but for example in a direction oriented radially outward. Suitable dead spaces 20 are provided for this, for example in the positioning means 15 next to the positioning element 16 and inside the recess 13, at the radially outer end.

If the first seal (11, inner seal) should fail or lose its sealing action, the other second seal 12 serves as a safety seal (fail-safe seal). A simultaneous failure of the first and the second seal within a module connector 4 is distinctly less probable than a failure of only one seal, so that the module connector 4 produces a more efficient sealing.

FIGS. 4A/B show various views of one variant of a module connector 4. Accordingly, the first flange 5 comprises a step 21, so that the flange 5 is somewhat thicker on the outside. The second flange 5 can be installed in the resulting recess of the flange 5; the second flange 5 likewise has a step 21, so that the second flange 5 is somewhat thinner on the outside. The stepped shape of the flanges 5 has the effect that the flanges 5 can be placed exactly on top of one another. The recess 13 for the first seal 11 is arranged in the second flange 5, as is the groove 14 for the second seal 12. The groove 14 is arranged in the area of the step 21 of the second flange 5, i.e., where the second flange 5 is thicker on the outside. The end surface 22 of the first seal 11 is aligned with the container inner wall 23 and closes off flush with the container inner wall 23. In the area of the end surface 22 of the first seal 11, no cavity can be formed between seal 11 and flange 5 or inner wall 23, since the crimp region 24 of the seal 11 is pressed when connecting the flanges 5 so that the end face 22 of the seal 11 is exactly positioned and sits firmly there and provides defined sealing. Even upon expansion of the seal 11 the position of the end surface 22 will not change; an expansion will occur on the radially outer side of the seal 11, for which at least one dead space 20 is provided between seal 11 and/or recess 13 or between positioning element (16, web) and positioning means (15, groove for web).

A configuration of a module connector 4 with an intermediate element 7 can be seen in FIGS. 5A and 5B. FIG. 5B shows a top view; a cross sectional view of FIG. 5B can be seen in FIG. 5A. The intermediate element 7 is arranged between the flange surface 18 of the first flange 5 and the flange surface 18 of the second flange 5. Between the sealing surfaces 25 of the intermediate element 7 and the flange surface 18 of the first flange 5 is arranged a part seal 26 of the first seal 11. Between the opposite sealing surface 25 of the intermediate element 7 and the flange surface 18 of the second flange 5 is arranged a second part seal 26 of the first seal 11. The intermediate element 7 is arranged between the first part seal 26 and the second part seal 26 of the first seal 11. Each part seal 26 comprises a positioning element 16 fashioned as a web. The positioning element 16 of the first part seal 26 engages in a groove 15 in the part seal recess 27 of the first flange 5, the positioning element 16 of the second part seal 26 engages in a groove 15 in the part seal recess 27 of the second flange 5.

A representation of the module connector 4 of FIG. 5A/B in the disassembled state can be seen in FIG. 6A (exploded view). Accordingly, each part seal 26 of the first seal 11 comprises a crimp region 24 formed as a wedge surface 17. Accordingly, each part seal 26 of the first seal 11 comprises a seal body, on which is arranged on the one hand the wedge-shaped crimp region 24 and on the other hand the positioning element 16. The first part seal 26 and the second part seal 26 of a first seal 11 have mirror symmetry contours, since one part seal 26 is arranged on the first side of the intermediate element 7 and the other part seal 26 on the second opposite side of the intermediate element 7.

FIGS. 7A to 7D show various views of an alternative configuration of a module connector 4. The module connector 4 of FIGS. 7A to 7D provides a connector duct 28 between the recesses 27 for part seals 26 of the first seal 11 and the groove 14 for the second seal 12 (see FIG. 7D). The connection duct 28 fluidically connects the part seal recesses 27 and the groove 14, so that the part seal recesses 27 and the groove 14 form an internal cavity or duct system, which can be evacuated via a connection 8 and monitored in regard to the internal gas pressure. A second, for example diametrically opposite bypass 9 may be provided, with which a flow can be created inside the internal cavity system. In this way, particles can be washed out from the cavity system, for example.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

LIST OF REFERENCE NUMBERS 1 (Modular) container
2 Vacuum conveyor
3 Module
4 Module connector
5 Flange
6 Fastening means, screw, nut
7 Intermediate element
8 Connection
9 Bypass
10 Lump breaker
11 First seal
12 Second seal
13 Recess
14 Groove
15 Positioning means
16 Positioning element
17 Wedge surface
18 Flange surface
19 Container interior
20 Dead space
21 Step
22 End face
23 Container inner wall
24 Crimp region
25 Sealing surface
26 Part seal
27 Part seal recess
28 Connection duct
29 Offset

The invention claimed is:

1. A module connector for connecting
a first container module having a first flange with a first flange surface,
to a second container module having a second flange with a second flange surface,
wherein the container modules being joined together have an aligned, especially a flush, container inner surface,
wherein a first seal is arranged between the first container module and the second container module,
wherein a second seal is arranged between the first container module and the second container module,
wherein the first seal is arranged in a recess and the second seal in a groove,
wherein preferably the first seal forms an inner sealing with respect to the container and wherein preferably the second seal forms an outer sealing with respect to the container,
wherein the second, preferably outer seal produces a sealing of the interconnected container modules especially if the first, preferably inner seal fails or at least has a leak,
wherein the first seal has at least one crimp region, which when the first flange is arranged at or on the second flange is crimped by the first and/or the second flange surface, preferably by the first flange surface, such that one end face of the first seal is situated flush and/or aligned with the container inner surface and without forming a cavity in the area of the end face of the first seal.

2. The module connector as claimed in claim 1, wherein the recess and/or the groove is/are arranged in the first and/or in the second flange.

3. The module connector as claimed claim 1, wherein the groove and/or the recess and/or at least one part seal recess are fluidically connected to at least one bypass, preferably with an inlet bypass and an outlet bypass, which is connectible in particular to a pump and/or to a pressure metering, by which a flow in the groove and/or in a part region of the recess or in a part region of the at least one part seal recess can preferably be created.

4. The module connector as claimed in claim 1, wherein the first seal or a part seal of the first seal, especially the crimp region of the seal or the part seal, is formed from a flexible material, and wherein the crimp region of the seal or the part seal in the non-connected state of the container modules protrudes from the recess or part seal recess, and wherein the crimp region of the seal or part seal in the connected state of the container modules is shoved or press-fitted by mechanical pressure into the region of the recess or part seal recess.

5. The module connector as claimed in claim 1, wherein the crimp region of the seal or the part seal comprises at least one wedge surface, and/or at least one bulge, and/or at least one web.

6. The module connector as claimed in claim 1, wherein at least one positioning means is provided in the receptacle or in the part seal receptacle, which preferably comprises a groove or a bulge, and in which a positioning element of the seal or part seal can be arranged such that the seal or part seal is not movable in at least one direction, preferably in the direction pointing toward the container inner region.

7. The module connector as claimed in claim 1, wherein at least one dead space is provided in the region of the recess, but not in the region of the container inner wall, into which at least a section of the seal or part seal can expand mechanically, especially by thermal changes.

8. A seal element, for a module connector especially for the module connector as claimed in claim 1, the seal element comprises at least one end surface which is suited to be flush with at least one surface of one component of the module connector, preferably with an inner surface or container inner surface, wherein the seal element, preferably in the region of the end surface or bordering on the end surface, comprises a crimp region which can be press-fitted by mechanical action, especially a crimp region comprising at least one wedge surface, whereby the end surface of the seal element can be press-fitted into a recess situated in one component of the module connector for the seal, such that no cavities are formed in the region of the end surface of the seal element between the seal element and one component of the module connector, and wherein the seal element preferably has a substantially annular geometry.

9. The seal element as claimed in claim 8, wherein the seal element comprises a body with a substantially rectangular cross section geometry, wherein the crimp region is arranged on the body, and wherein preferably one positioning element, especially a web-shaped or ring-shaped positioning element is provided for the positioning in a groove or recess for the seal in one of the components of the module connector.

10. A module connector for connecting
a first container module having a first flange with a first flange surface,
to a second container module having a second flange with a second flange surface, and
an intermediate element arranged between the first container module and the second container module,
wherein the container modules being joined together have a flush container inner surface,
wherein there is arranged each time between the first container module and a first surface of the intermediate element and the second container module and a second surface of the intermediate element, situated opposite the first surface of the intermediate element, one of two part seals of a first seal, wherein a second seal is arranged between the first container module and the second container module,
wherein the part seals of the first seal are arranged respectively in a part seal recess and the second seal is arranged in a groove,
wherein the part seals of the first seal form preferably an inner seal with respect to the container, and wherein the second seal forms preferably an outer seal with respect to the container,
wherein the second, preferably outer seal provides a sealing of the interconnected container modules, especially if the first, preferably inner seal fails or at least has a leak,
wherein at least one of the part seals of the first seal, especially both part seals, each comprise at least one crimp region which, upon arranging the first flange at or on the second flange and at or on the intermediate element, is crimped by the first and/or the second surface of the intermediate element such that at least one end face of at least one part seal, especially both end faces of both part seals, of the first seal are arranged flush with the container inner surface and without forming a cavity in the region of the end faces of the part seals.

11. The module connector as claimed in claim 10, wherein the one part seal recess is arranged in the first flange and the second part seal recess in the second flange, and wherein the groove is situated in the first or in the second flange.

12. The module connector as claimed in claim 10, wherein one part seal recess is situated in a surface of the intermediate element, in particular one part seal recess is situated in the first surface of the intermediate element, and the second part seal recess is situated in the second surface of the intermediate element.

13. The module connector as claimed in claim 10, wherein the connected modules have a round or almost round cross section, and wherein the groove is formed as an annular groove, especially a circular annular groove, and wherein the recess or the at least one part seal recess has an annular geometry at least for a portion.

14. The module connector as claimed claim 10, wherein the groove and/or the recess and/or at least one part seal recess are fluidically connected to at least one bypass, preferably with an inlet bypass and an outlet bypass, which is connectible in particular to a pump and/or to a pressure metering, by which a flow in the groove and/or in a part region of the recess or in a part region of the at least one part seal recess can preferably be created.

15. The module connector as claimed in claim 14, wherein the recess or at least one part seal recess and the groove are fluidically interconnected by a connection duct, the connection duct being preferably situated in the first flange.

16. The module connector as claimed in claim 10, wherein the first seal or a part seal of the first seal, especially the crimp region of the seal or the part seal, is formed from a flexible material, and wherein the crimp region of the seal or the part seal in the non-connected state of the container modules protrudes from the recess or part seal recess, and wherein the crimp region of the seal or part seal in the connected state of the container modules is shoved or press-fitted by mechanical pressure into the region of the recess or part seal recess.

17. The module connector as claimed in claim 10, wherein the crimp region of the seal or the part seal comprises at least one wedge surface, and/or at least one bulge, and/or at least one web.

18. The module connector as claimed in claim 10, wherein at least one positioning means is provided in the receptacle or in the part seal receptacle, which preferably comprises a groove or a bulge, and in which a positioning element of the seal or part seal can be arranged such that the seal or part seal is not movable in at least one direction, preferably in the direction pointing toward the container inner region.

19. The module connector as claimed in claim 10, wherein at least one dead space is provided in the region of the recess, but not in the region of the container inner wall, into which at least a section of the seal or part seal can expand mechanically, especially by thermal changes.

20. A modular container for holding and/or transporting of bulk goods, wherein the container interior has a pressure difference with respect to the container exterior, preferably formed as a partial vacuum or an excess pressure, wherein the container is formed from a first container module which is tight relative to the container exterior and at least one second container module which is tight relative to the container exterior, the first container module and the at least second container module are joined together by a module connector as claimed in claim 1, which provides sealing with respect to the container exterior.

21. The container as claimed in claim 20, wherein the container modules and the module connector are electrically conductive.

22. The container as claimed in claim 20, wherein the container is formed from a vacuum conveyor or comprises a vacuum conveyor, and/or it is formed from a lump breaker or comprises a lump breaker.

* * * * *